Patented Dec. 24, 1929

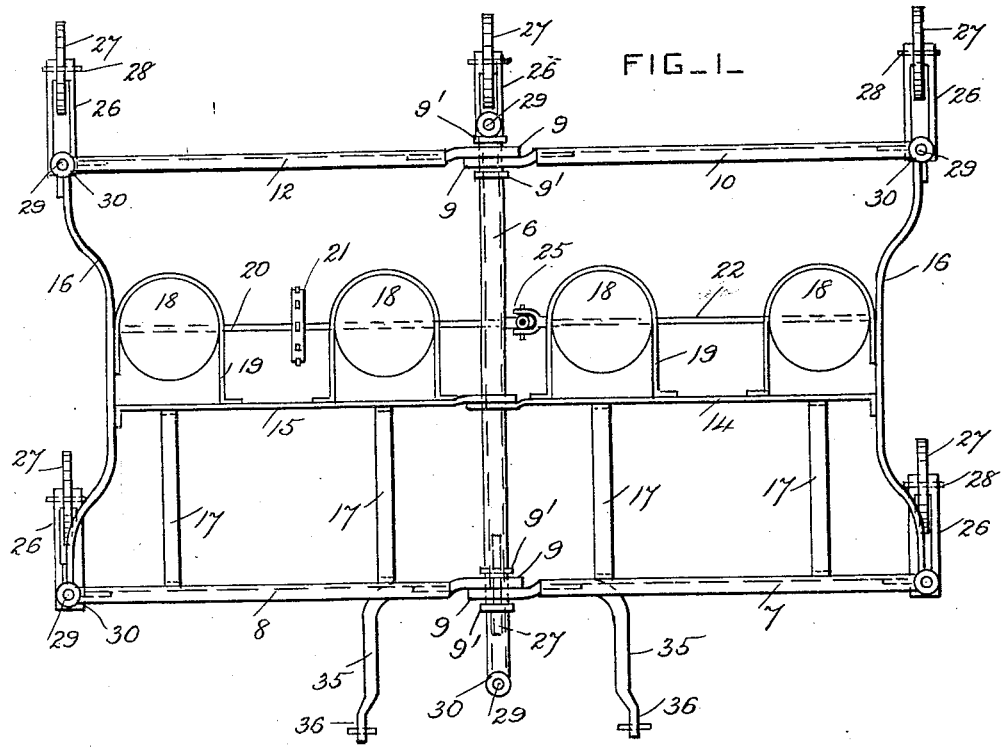

1,740,751

UNITED STATES PATENT OFFICE

LEONARD EARL SMITH, OF CORPUS CHRISTI, TEXAS, ASSIGNOR TO INTERNATIONAL HARVESTER COMPANY, A CORPORATION OF NEW JERSEY

TRUCK FOR TRACTOR-DRAWN IMPLEMENTS

Application filed June 15, 1926. Serial No. 116,114.

This invention relates to planters for corn, cotton, peanuts and other similar crops; and it consists of a truck for supporting a series of planters or planting devices arranged side by side so that a series of rows can be planted at one time, the frame of the said truck being adapted for connection to a tractor and arranged and supported so that it can turn around as a unit with the tractor and pass over uneven ground with facility.

In the drawings, Figure 1 is a plan view of a truck for planters constructed according to this invention. Fig. 2 is a side view of the same. Fig. 3 is a front end view of the truck. Fig. 4 is a detail view of one of the pins 32 to a larger scale.

The frame of the truck is provided with a central longitudinal bar 6 which is preferably formed of an iron tube. Two front crossbars 7 and 8 are provided, and have bearings 9 on their adjacent end portions which are pivoted on the bar 6 between collars 9'. The front crossbars are arranged in line with each other and they project in opposite directions. Two rear crossbars 10 and 12 are pivoted on the bar 6 by bearings 9 in a similar manner to the front crossbars. Two intermediate crossbars 14 and 15 are also pivoted by bearings 9 on the bar 6, and the three sets of crossbars are arranged parallel to each other. Side bars 16 are secured to the free end portions of the crossbars, one at each side of the frame.

The front crossbars are preferably connected with the intermediate crossbars behind them by longitudinal braces 17. The planting devices are of any approved construction, and four complete planting devices are provided, each of which may work independently of the others.

The seed hoppers 18 of these planting devices are shown, and are secured to the intermediate crossbars 14 and 15 by brackets 19. These hoppers are shown spaced at equal distances apart, but they can be arranged and adjusted so as to be at unequal distances apart, or at various equal distances apart, according to the nature of the crop to be planted. The two hoppers or planting devices secured to the intermediate crossbar 15 have a single driving shaft 20, common to them, and provided with a driving wheel 21. The driving is preferably effected from the tractor used for drawing the truck along, and the wheel 21 is preferably a sprocket wheel so that it can be driven from the tractor by a drive chain. The other two hoppers, secured to the intermediate crossbar 14, have their planting devices provided with a driving shaft 22 which is driven from the shaft 20 by a universal joint or coupling 25 of any approved construction.

The frame of the truck is supported by six similar casters 26. Each caster has a ground wheel 27 journaled on a horizontal pin 28, and has also a swivel pin 29 mounted to oscillate in an upright position in a bearing block or socket 30. Two bearing blocks are secured to the front and rear ends of the central longitudinal bar 6 respectively, and a bearing block is secured to the free end of each of the front and rear crossbars.

When the truck is drawn along by a tractor the front crossbars are preferably provided with downwardly projecting pins 32 which are pivotally connected with them at their upper ends by horizontal pins 33, or in any other approved way, so that the pins 32 are not tilted by the movement of the crossbars. A coupling bar 34 is provided, and has holes which are slipped loosely over the lower end portions of the pins 32, and this bar 34 has at its ends forwardly projecting arms 35 which are pivotally connected by eyes 36 with the tractor in any approved way. The truck is thus held against lateral movement with respect to the bar 34 and the tractor, and turns with the tractor as a unit. Guards 37 are provided for limiting the movements of the pins 32.

When the planters are mounted on a truck in this manner, four rows can be planted at each passage of the machine across the field. The casters swivel on their swivel pins 29 so that the machine can be drawn along upon curved lines, and can be turned around with facility at each end of the field. The pivoted crossbars move pivotally with respect to the central longitudinal bar so that the truck is adapted to pass over uneven ground without any one of the caster wheels being lifted off the ground, and each portion of the truck frame always supports its proper proportion of the load.

The coupling bar 34 couples the vertical pins 32 together, and its arms 35 are not affected by the pivotal movements of the front crossbars. The crossbars are all pivoted loosely on the central longitudinal bar, and their bearings 9 are free to move a little on the said bar between the collars 9', so that each corner of the frame may follow the movement of the caster wheel which supports it in passing over rough ground. The truck frame is preferably formed of iron, or other similar material which is slightly resilient, so as to facilitate its movements, and iron bars channel-shaped in cross-section are preferred for the cross-bars. The vertical pins 32 have nuts 38 or other similar devices at their bottom ends to prevent the coupling bar 34 from dropping off them, and the coupling bar is free to rock or tilt on the said pins.

What I claim is:

1. A truck for planters, comprising a central longitudinal bar provided with casters at its ends, front and rear crossbars pivoted on the longitudinal bar and projecting on opposite sides of it and provided with casters at their free ends, the longitudinal bar extending in advance of the front crossbar, and means for connecting the truck to a tractor comprising coupling elements spaced laterally from the forward end of the longitudinal bar.

2. A truck for planters as set forth in claim 1, the tractor connecting means comprising a U-shaped coupling bar intersecting the longitudinal member and having forwardly projecting arms for attaching it to a tractor, and means which connect lateral portions of the coupling bar with the front crossbars.

3. A truck for planters as set forth in claim 2, the coupling bar connections comprising downwardly projecting pins pivoted to the front crossbars with the U-shaped coupling bar loosely connected to the said pins.

4. An implement frame structure for connection to tractors, comprising a U-shaped coupling bar the arms of which are adapted to be pivoted to a tractor on a transverse horizontal axis, frame members extending outwardly beyond each side of the coupling bar, means connecting each member to the coupling bar for pivotal movement on a horizontal axis at right angles to the axis of the coupling bar, means for retaining said members in perpendicular relation to said axis, and caster wheels supporting the outer portions of said frame members.

5. An implement frame structure for connection to tractors, comprising a U-shaped coupling bar the arms of which are adapted to be pivoted to a tractor on a transverse horizontal axis, ground engaging supporting means located on a line midway between and parallel with the arms of said coupling bar, frame members extending outwardly beyond each side of the coupling bar, means connecting said member to said support and to the coupling bar for pivotal movement on a fixed horizontal axis at right angles to the axis of the coupling bar, and caster wheels supporting the outer portions of said frame members.

6. An implement frame structure for connection to tractors, comprising a U-shaped coupling bar having its arms adapted for connection to a tractor, a central longitudinally extending frame member having its front end extending over the cross portion of said U-shaped bar, means for supporting the front end of said member, a caster wheel supporting the rear end of said member, a laterally extending floating frame at each side of said central member pivoted to said member at longitudinally spaced points for movement vertically, caster wheels supporting the outer sides of said floating frames, and means connecting the U-shaped bar to the other parts of the structure for joint movement horizontally while permitting independent vertical movement of the floating frames.

7. An implement frame structure for connection to tractors, comprising a U-shaped coupling bar having its arms adapted for connection to a tractor, a central longitudinally extending frame member having its front end extending over the cross portion of said U-shaped bar, a caster wheel supporting the rear end of said member, a second caster wheel supporting the front end of said member and located between the arms of the coupling bar, a laterally extending floating frame at each side of said central member pivoted to said member at longitudinally spaced points for movement vertically, caster wheels supporting the outer sides of said floating frames, and a flexible draft connection between each floating frame and the U-shaped bar.

In testimony whereof I have affixed my signature.

LEONARD EARL SMITH.